Aug. 9, 1966     L. J. WUBBE     3,265,415

WIPER ARM PIVOT JOINT

Original Filed Oct. 22, 1962

INVENTOR.
LEO J. WUBBE

BY

ATTORNEY

United States Patent Office 3,265,415
Patented August 9, 1966

3,265,415
WIPER ARM PIVOT JOINT
Leo J. Wubbe, Beverly Shores, Ind., assignor to The Anderson Company, a corporation of Indiana
Continuation of application Ser. No. 231,951, Oct. 22, 1962. This application Jan. 25, 1965, Ser. No. 427,557
1 Claim. (Cl. 287—93)

The subject invention relates generally to windshield wiper arms, and more particularly is directed to improvements in means for pivotally connecting the inner shaft-attaching section or part of a windshield wiper arm to outer section or part carrying the wiper blade and is a continuation of U.S. patent application Serial No. 231,-951 filed October 22, 1962, and now abandoned.

Because windshield wiper arms are being made heavier and longer and the blades are directed across surfaces of variable curvatures, greater spring pressures are required to maintain the blade in proper wiping relation against the surface of a windshield, all of which places considerable pivotal and torsion strain on the pivotal connection between the arm sections or parts.

With the foregoing in mind, objects of the invention are: to provide an assembly in which the outer blade-carrying part includes a channel portion or member having side walls provided with aligned openings and the inner arm part includes a portion disposed in the channel between its side walls and provided with a bore aligned with the openings, and in which an elongate cylindrical pin extends through aforesaid bore and has reduced extremities which are press-fitted into aforesaid aligned openings to effect a locking of the pin and channel together as a unit for pivotal movement relative to the inner arm part; to provide an assembly of the character above described in which the cylindrical portion and reduced extremities of the elongate pin form annular shoulders which are engaged by the side walls of the channel for maintaining these walls in a predetermined spaced relationship and increasing the frictional engagement between the pin and walls; and to provide an assembly of the kind described in which the inner part or section may be provided with a cylindrical bearing sleeve which is press-fitted into the bore and pivotally receives the elongate pin above referred to.

Further objects of the invention are to provide an arrangement whereby the elongate pin can be readily snapped into registry with the channel portion of the arm and to provide an assembly in which relatively large concentrically arranged bearing surfaces are provided between the inner and outer arm parts.

Other objects of the invention reside in providing an organization of components which offer advantages with respect to manufacture and assembly, efficiency in operation and durability.

Additional advantages of the invention will become apparent after the description hereinafter set forth is considered in conjunction with the drawings annexed hereto.

Figure 1:
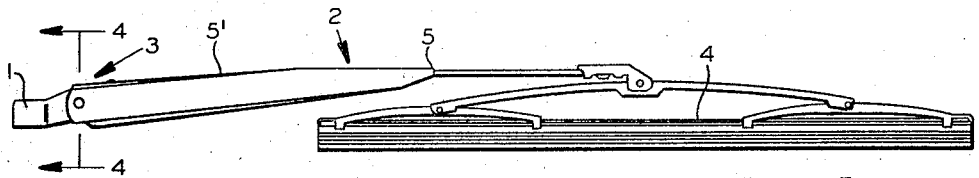
FIGURE 1 is a side elevational view of a wiper arm embodying the invention and a wiper blade carried by an outer section or part of the arm.

As shown in the drawing, an inner part or section 1 of a pressure-applying windshield wiper arm, generally designated 2, is provided with means (not shown) for attachment to driving means; an outer part or section 5 is pivotally connected to the fitting by pivot means generally designated 3. Wiper blade 4 is pivotally attached to section 5.

The outer arm part 5 includes a channel member or portion 5' having resiliently deformable side walls 7 and a top or bridging wall 6 which spaces side walls 7 apart and aids in holding them in resiliently deformable relation to each other. The outer portion of 5 is preferably constructed of bar stock and has its inner end secured in the outer end of the channel. A spring or biasing means (not shown) is disposed in the channel portion and is operatively connected to the inner arm part 1 so as to urge outer part 5 and blade 4 toward the surface of a windshield to be wiped. Side walls 7 are provided with aligned circular openings or apertures 8, defined or surrounded by marginal edge portions of the material from which the channel is made.

The inner arm part 1 has a head portion 9 rigidly or fixedly attached or connected thereto, which head portion is disposed between side walls 7 and is provided with a transverse cylindrical bore 10. A cylindrical tubular bearing sleeve 11, press-fitted into bore 10 until its ends are flush with parallel side surfaces of head portion 9, provides a sufarce adapted to act as part of a pivotal bearing. Disposed within cylindrical bearing sleeve 11 is an elongate pivot element or pin member 12 which has a cylindrical center bearing portion extending beyond sleeve 11 and reduced cylindrical extremities 13, which have rounded or hemispherical outermost ends.

Figures 2, 3:
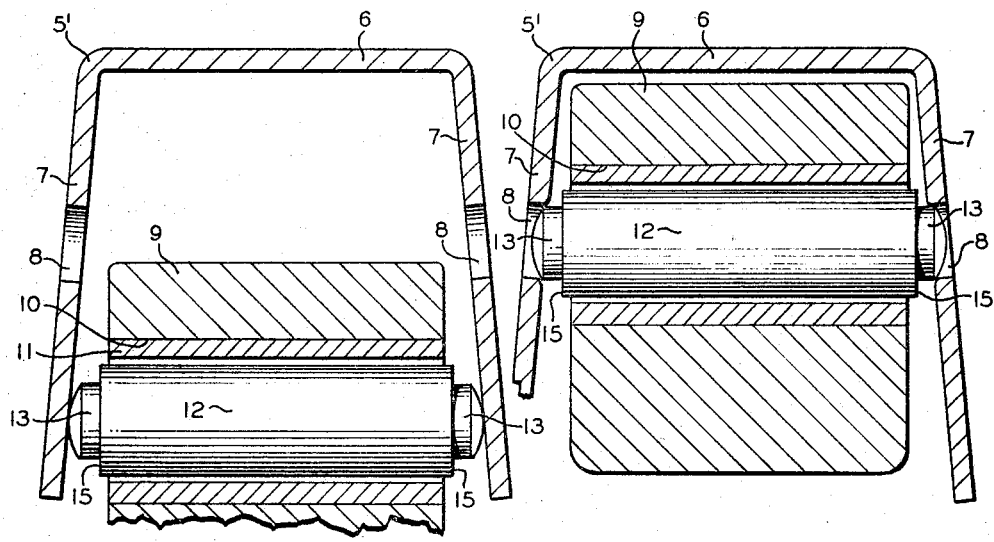
FIGURE 2 is an enlarged partial vertical section showing one step of assembling the components.
FIGURE 3 is an enlarged partial vertical section similar to FIGURE 2 showing a second step of assembling the components.

As shown in FIGURE 2, the overall length of pin member 12 is slightly greater than the internal width of channel portion 5 (and bridging wall 6, as measured between side walls 7), so that when pin member 12 is forced into channel portion 5', the resiliently deformable side walls 7 thereof will be sprung or cammed outwardly. The rounded ends of reduced extremities 13 ride against the inner surfaces of walls 7 and then snap into position for entry into openings 8 when brought into registry therewith. Pin 12 is thus substantially self-locating. The diameters of cylindrical extremities 13 are slightly greater than the diameters of openings 8. Consequently, when the extremities 13 of pin member 12 are press-fitted into openings 8 they distort, to some extent, the material surrounding the openings, as indicated at 14 in FIGURE 4. FIGURE 3 shows the reduced extremities 13 in the first stage of pressure entry, after registry, into openings 8.

Figure 4:
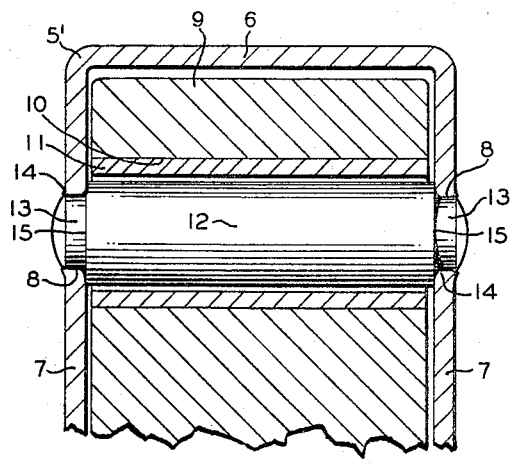
FIGURE 4 is an enlarged vertical section taken substantially on line 4—4 of FIGURE 1, showing the components as permanently assembled.

The center cylindrical bearing portion and the reduced extremities 13 of head portion 9 form annular shoulders 15 that are forcibly engaged by inner planar surfaces of the side walls 7 thus providing an area of contact or frictional engagement between pin member 12 and walls 7 in addition to the engagement of extremities 13 by the sides of openings 8. Since the cylindrical center bearing portion of pin member 12 is longer than the width of head portion 9 (and sleeve 11), it projects therebeyond and provides clearances so that outer arm part 5, rigidly secured to pin member 12, can be freely pivoted relative to inner arm part 1 which is secured to head portion 9, subject to the pull exerted by the biasing means above referred to. With this arrangement, the various components are held in operative relationship with relatively large concentrically arranged cylindrical bearing surfaces between the sleeve and elongate member which serve to stabilize relative movement between the arm sections. While FIGURES 2–4 show sleeve 11, such sleeve may be omitted if bore 10 of head portion 9 is properly sized and provided with a bearing surface.

Having thus described my invention, it is obvious that various modifications may be made in the same without departing from the spirit of the invention; and, therefore, I do not wish to be understood as limiting my self to the exact form, construction, arrangement and combination of parts herein shown and described.

I claim:

A windshield wiper arm having inner and outer parts pivotally connected together comprising in combination:
  a channel portion of said outer arm part having a pair of parallel side walls spaced apart by a bridging wall,
  said spaced-apart parallel walls having aligned circular apertures,
  a head portion of said inner part disposed between said spaced-apart walls,
  said head portion having a cylindrical bore with a surface adapted to provide part of a pivotal bearing coaxially aligned with said apertures,
  a pin member having a cylindrical surface adapted to act as the other part of said bearing and having reduced cylindrical portions at opposite ends thereof thereby defining annular shoulders,
  the length of the cylindrical bearing surface of said pin member being greater than the length of cylindrical bearing surface of said head portion so that said shoulders extend beyond both sides of said head portion, said reduced cylindrical extremities being of a diameter slightly larger than the original diameter of said aligned apertures in said walls,
  said reduced cylindrical extremities having been force-fitted into said aligned apertures so as to fixedly secure said pin member with respect to said walls adjacent said shoulders, said walls thereby abutting said shoulders and being spaced from the head portion of the inner part of the arm for free pivotal movement therebetween,
  said pin member having rounded ends,
  said spaced-apart parallel walls being held by said bridging wall in resiliently deformable relation to each other so that the assembled head portion and pin member can resiliently force apart said spaced-apart parallel walls with the rounded ends of the pin member seeking alignment with said circular apertures during assembly of said channel portion, head portion and pin member.

References Cited by the Examiner

UNITED STATES PATENTS

| | | | |
|---|---|---|---|
| 355,620 | 1/1887 | Morgan | 74—251 X |
| 594,009 | 11/1897 | Harrington | 74—251 X |
| 664,481 | 12/1900 | Jacobs | 74—251 |
| 1,208,861 | 12/1916 | Trimble | 287—14 |
| 1,943,418 | 1/1934 | Brown. | |
| 2,499,809 | 3/1950 | Zaiger. | |
| 2,844,838 | 7/1958 | Krohm. | |
| 2,979,352 | 4/1961 | Anderson. | |
| 3,099,030 | 7/1963 | Zury | 15—250.35 |

FOREIGN PATENTS 12,097  1899  Great Britain.

CARL W. TOMLIN, *Primary Examiner.*

A. V. KUNDRAT, *Assistant Examiner.*